Dec. 11, 1934.       W. H. RADFORD       1,983,877
MOTOR VEHICLE
Filed Dec. 22, 1930       2 Sheets-Sheet 1
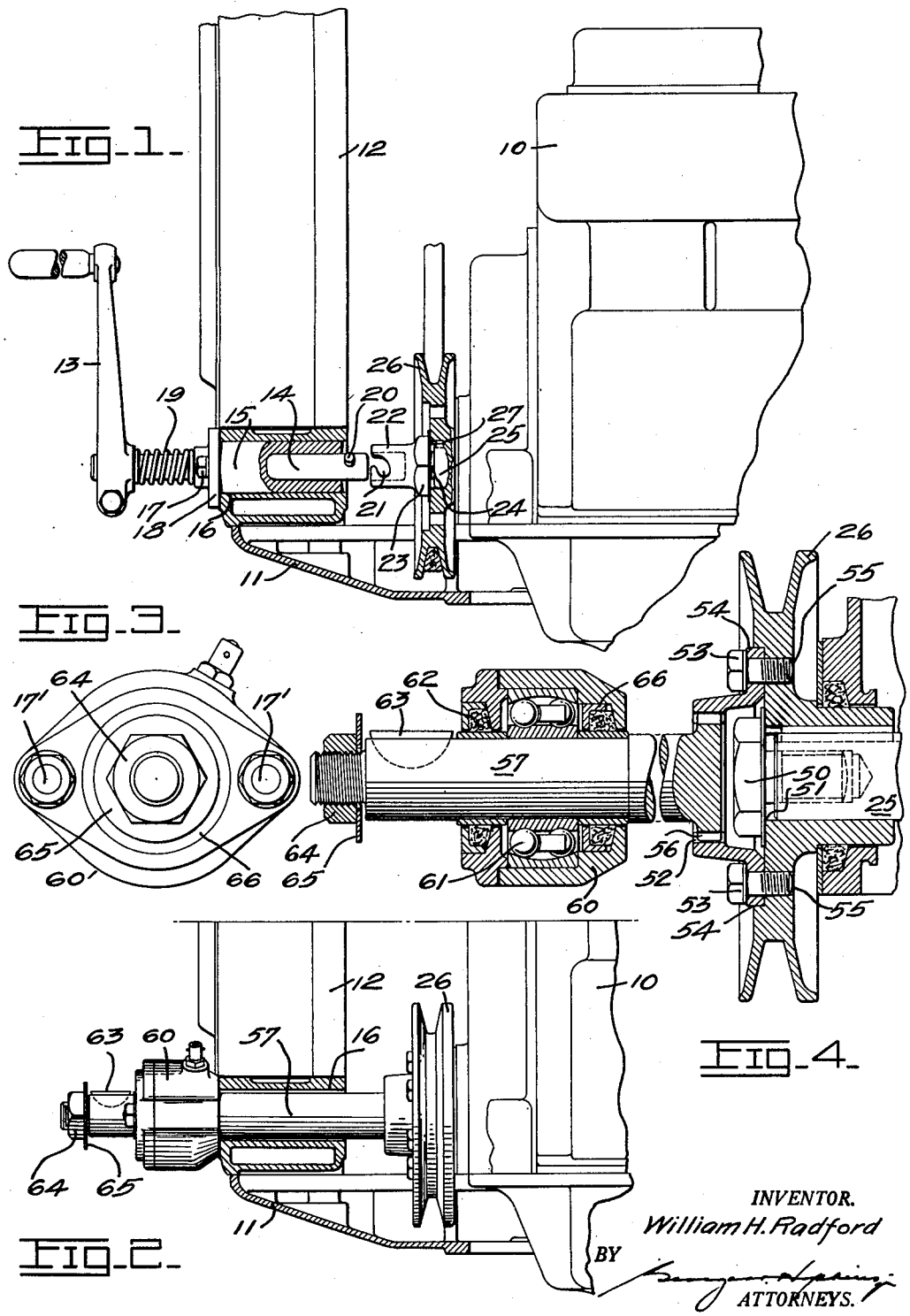

Dec. 11, 1934.   W. H. RADFORD   1,983,877
MOTOR VEHICLE
Filed Dec. 22, 1930   2 Sheets-Sheet 2
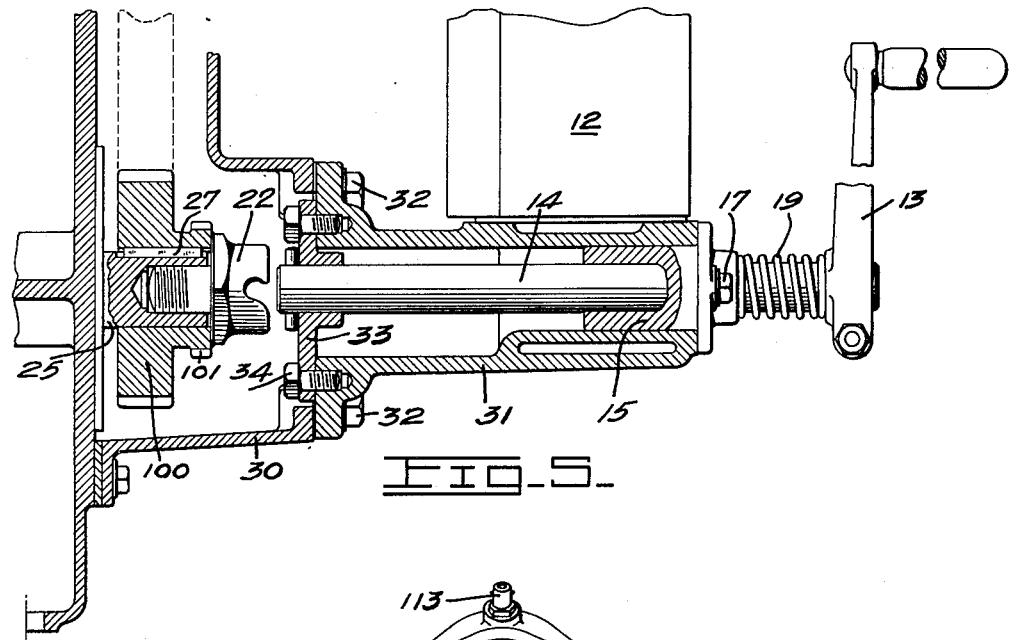
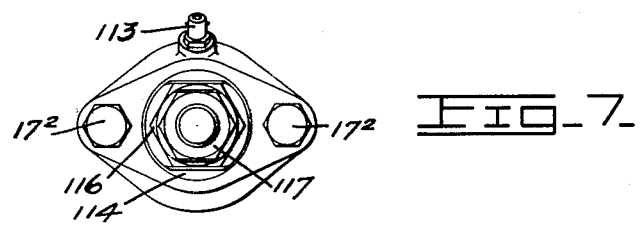
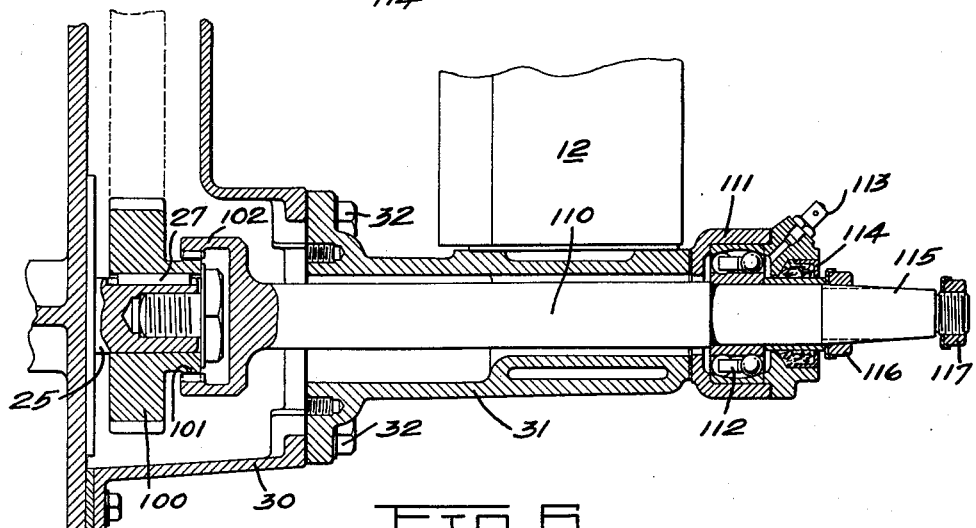
INVENTOR.
William H. Radford
BY
ATTORNEYS.

Patented Dec. 11, 1934

1,983,877

UNITED STATES PATENT OFFICE 1,983,877

MOTOR VEHICLE

William H. Radford, Peoria, Ill., assignor to Caterpillar Tractor Co., San Leandro, Calif., a corporation of California Application December 22, 1930, Serial No. 504,024

14 Claims. (Cl. 180—53)

My invention relates to improvement in motor vehicles, particularly to tractors; and the objects of my invention are, first, to provide means in a tractor for power take-off; second, to provide means in a tractor to take power off the front end.

I obtain these objects with the mechanism illustrated in the accompanying drawings.

Description of figures

Fig. 1 is a side elevation of the front end of a tractor in which the power take-off device is adapted to be installed.

Fig. 2 is a side elevation showing the device installed.

Fig. 3 is a front elevation of the device.

Fig. 4 is a longitudinal section thereof.

Figs. 5 to 7 illustrate another embodiment of the invention.

Fig. 5 is a front elevation of a tractor adapted to receive the power take-off device.

Fig. 6 is a longitudinal section showing the device installed.

Fig. 7 is a front elevation thereof.

Description of mechanism

The tractor is provided with a motor 10 and a forwardly projecting bracket 11 secured thereto, radiator 12 being mounted on bracket 11. The usual starting crank 13 is connected to the end of shaft 14, slidable in member 15, received in aperture 16 in the base of radiator 12. Member 15 is held in place by bolts 17 which pass through flange 18 and a portion of radiator 12. Spring 19 urges crank 13 and shaft 14 to the left in Fig. 1 to disengage pin 20 from slots 21 in sleeve 22, which is formed with a nut portion 23 and screw portion 24 threaded into the end of motor shaft 25 to which pulley 26 is fastened by means of key 27.

To install the power take-off device as shown in Fig. 2, bolts 17, member 15 and the crank assembly are removed and sleeve 22 is screwed out of shaft 25. Screw 50 is threaded into the end of shaft 25 and is provided with washer 51 to assist in sealing the aperture. An internal gear 52 is attached to pulley 26 by screws 53 which pass through flange 54 and are threaded into apertures 55 in pulley 26.

Pinion 56 is positioned to mesh with internal gear 52 to form a driving connection which does not require accurate aligning. Shaft 57 is formed integrally with pinion 56 and extends forwardly through aperture 16 in radiator 12 to enter housing 60 where it is supported in anti-friction bearing 61 which is suitably mounted in housing 60 and protected by seals 62, 66. Housing 60 is secured to the front of the radiator by bolts $17^1$ in the same manner as was member 15. Shaft 57 projects forwardly from housing 60 where it is equipped with key 63, nut 64, and washer 65 to secure a gear or other driving member thereto. The installation can be readily accomplished by having gear 56 of small enough diameter to be insertable through aperture or passage 16 when sleeve member 15 is removed; or should the diameter of the gear 56 be too large, then shaft 57 can be connected after the radiator 12 is first removed, and the radiator passage 16 can subsequently be slipped over shaft 57.

In the embodiment disclosed in Figs. 5 to 7, pinion 100 is shown in place of pulley 26 secured in the same manner on the shaft 25. The crank assembly is substantially identical with the assembly disclosed in the first embodiment. However, as shown in Fig. 5, the mechanism is entirely encased, housing 30 being attached to the front end of the motor, and bracket 31 which supports radiator 12 is bolted to housing 30 by bolts 32. The inner end of shaft 14 is supported in cover plate 33 secured by screws 34 to the inner end of bracket 31.

To install the power take-off device, the crank assembly, including its supports 33 and 15, are removed, and power take-off shaft 110 is installed, as shown in Fig. 6. Pinion 100 has formed integrally therewith pinion 101 which forms one element of the drive connection, the other element of which is internal gear 102 formed integrally with the inner end of shaft 110. The outer end of shaft 110 enters housing 111 secured by bolts $17^2$ to bracket 31. Housing 111 contains anti-friction bearings 112 for supporting shaft 110 for rotation. The bearings are lubricated by supplying lubricant through fitting 113. At the point where the shaft 110 projects from the housing 111, a seal 114 is provided. The projecting end 115 of shaft 110 is tapered and equipped with nuts 116, 117 to receive a pulley, or other device for transmitting power from power take-off shaft 110 to whatever mechanism it is desired to operate. The installation of the modification of Figs. 5 through 7 can be accomplished by first removing the radiator, and subsequently after shaft 110 is connected slipping tubular part 31 over shaft 110.

It will be understood from the above description that when it is desired to obtain power from the tractor for external use, the crank assembly is removed and the power take-off device is readily installed. Provisions are made for starting the motor in some manner other than by the usual crank, as by means of a power starter or a crank attached at some other point as, for example, at the rear of the tractor.

I, therefore, claim as my invention:

1. The combination with a motor vehicle having a motor, a motor shaft, and a structure including a radiator part and means for supporting the radiator in spaced relationship to said motor, said structure having a passage adjacent the bottom of said radiator into which a crank is adapted normally to be inserted for starting said motor, of a power take-off device comprising a power take-off shaft passing through said passage, means for connecting the power take-off shaft adjacent one end thereof to said motor shaft, and means secured to said structure and in alignment with said passage for providing a journal for said power take-off shaft adjacent the opposite end thereof.

2. The combination with a motor vehicle having a motor, a motor shaft, and a structure including a radiator part and means for supporting the radiator in spaced relationship to said motor, said structure having a passage adjacent the bottom of said radiator into which a crank is adapted normally to be inserted for starting said motor, of a power take-off device comprising a unitary power take-off shaft passing through said passage, means for connecting the power take-off shaft adjacent one end thereof to said motor shaft, said connecting means including an internal gear and an external gear one of which is fixed to the motor shaft and the other to the power take-off shaft, and means secured to said structure and in alignment with said passage for providing a journal for said power take-off shaft adjacent the opposite end thereof.

3. The combination with a motor vehicle having a motor, a motor shaft, and a structure including a radiator part and means for supporting the radiator in spaced relationship to said motor, said structure having a passage adjacent the bottom of said radiator into which a crank is adapted normally to be inserted for starting said motor, of a power take-off device comprising a power take-off shaft passing through said passage, means for detachably connecting the power take-off shaft adjacent one end thereof for continual rotation with said motor shaft, and means detachably secured to said structure and in alignment with said passage for providing a journal for said power take-off shaft adjacent the opposite end thereof.

4. The combination with a motor vehicle having a motor, a motor shaft, and a structure including a radiator part and means for supporting the radiator in spaced relationship to said motor, said structure having a passage adjacent the bottom of said radiator into which a crank is adapted normally to be inserted for starting said motor, of a power take-off device comprising a unitary power take-off shaft passing through said passage, means for connecting the power take-off shaft adjacent one end thereof for continual rotation with said motor shaft, said connecting means including an internal gear and an external gear one of which is fixed to the motor shaft and the other of which is integral with the power take-off shaft, and anti-friction means detachably secured to said structure and in alignment with said passage for providing a journal for said power take-off shaft adjacent the opposite end thereof.

5. In a motor vehicle, a motor having a shaft, a bracket extending forwardly from said motor, a radiator mounted on said bracket and having a portion adjacent the bracket provided with a passage through which a crank is adapted normally to be inserted for starting said motor, a unitary power take-off shaft extending through said passage, means for detachably connecting said power take-off shaft for continual rotation with said motor shaft, and means detachably secured to said portion of the radiator and in alignment with said passage for providing a journal for the power take-off shaft.

6. In a motor vehicle, a motor having a shaft, a bracket extending forwardly from said motor, a radiator mounted on said bracket and having a portion adjacent the bracket provided with a passage through which a crank is adapted normally to be inserted for starting said motor, a unitary power take-off shaft extending through said passage, means for detachably connecting said power take-off shaft for continual rotation with said motor shaft, said connecting means including an internal gear and an external gear one of which is fixed to the motor shaft and the other of which is integral with the power take-off shaft, and means detachably secured to said portion of the radiator and in alignment with said passage for providing a journal for the power take-off shaft.

7. In a motor vehicle, a motor having a shaft projecting therefrom, a housing for the shaft connected with the motor and having an aperture therein, a radiator supporting bracket including an elongated portion secured to the housing and having a passage in said portion communicating with the aperture, a unitary power take-off shaft extending through said passage and aperture, means for detachably connecting said power take-off shaft for continual rotation with said motor shaft, and means detachably secured to the bracket and in alignment with said passage for providing a journal for the power take-off shaft.

8. In a motor vehicle, a motor having a shaft projecting therefrom, a housing for the shaft connected with the motor and having an aperture therein, a radiator supporting bracket including an elongated portion secured to the housing and having a passage in said portion communicating with the aperture, a unitary power take-off shaft extending through said passage and aperture, means for detachably connecting said power take-off shaft for continual rotation with said motor shaft, said connecting means including an internal gear and an external gear one of which is fixed to the motor shaft and the other of which is integral with the power take-off shaft, and means detachably secured to the bracket and in alignment with said passage for providing a journal for the power take-off shaft.

9. The combination with a motor having a shaft, and means for supporting a radiator in spaced relationship to said motor, the radiator having a portion adjacent the bottom thereof provided with a passage through which a crank is adapted to be inserted for starting said motor, of a power take-off device comprising a power take-off shaft passing through said passage, means for connecting the power take-off shaft adjacent one end thereof to said motor shaft, and means secured to said radiator portion and in alignment with said passage for providing a journal for the power take-off shaft.

10. The combination with a motor having a shaft, and means for supporting a radiator in spaced relationship to said motor, the radiator having a portion adjacent the bottom thereof provided with a passage through which a crank is adapted to be inserted for starting said motor, of a power take-off device comprising a single power take-off shaft passing through said passage, means for connecting the power take-off shaft adjacent one end thereof to said motor shaft, said connecting means including an internal gear and an external gear one of which is fixed to the motor shaft and the other to the power take-off shaft, and means secured to said radiator portion and in alignment with said passage for providing a journal for the power take-off shaft.

11. The combination with a motor having a shaft, a supporting member, means for attaching the member to the motor, a radiator mounted on said member and in spaced relationship to said motor, the member having a passage through which a crank is adapted to be inserted for starting said motor, of a power take-off device comprising a power take-off shaft passing through said passage, means for connecting the power take-off shaft adjacent one end thereof to said motor shaft, and means secured to said member and in alignment with said passage for providing a journal for the power take-off shaft.

12. The combination with a motor having a shaft, a supporting member, means for attaching the member to the motor, a radiator mounted on said member and in spaced relationship to said motor, the member having a passage through which a crank is adapted to be inserted for starting said motor, of a power take-off device comprising a single power take-off shaft passing through said passage, means for connecting the power take-off shaft adjacent one end thereof to said motor shaft, said connecting means including an internal gear and an external gear one of which is fixed to the motor shaft and the other to the power take-off shaft, and means secured to said member and in alignment with said passage for providing a journal for the power take-off shaft.

13. In a motor structure, the motor of said structure having a drive shaft terminating short of a face of said structure and said structure having a passageway leading from said face in alignment with said drive shaft; a power take-off assembly adapted to be detachably connected to said drive shaft consisting essentially of only two main parts, one part being a power take-off shaft insertable into said passageway and having means adjacent one end for detachable connection to said drive shaft, and the other part being a journal for said power take-off shaft adapted to be detachably connected directly to said structure in alignment with said passageway.

14. In a motor structure, the motor of said structure having a drive shaft terminating short of a face of said structure and said structure having a passageway leading from said face in alignment with said drive shaft; a power take-off assembly adapted to be detachably connected to said drive shaft consisting essentially of only two main parts, one part being a single power take-off shaft insertable into said passageway and having an integral gear adjacent one end thereof for telescopic connection with a complementary gear fixed for rotation with the motor shaft, and the other part being a journal for said power take-off shaft adapted to be detachably connected directly to said structure in alignment with said passageway.

WILLIAM H. RADFORD.